L. T. JOHNSON.
SCALE.
APPLICATION FILED OCT. 18, 1916.

1,401,704.

Patented Dec. 27, 1921.

Inventor:
Leonard T. Johnson
by Geo. L. Maxwell,
Attorney.

UNITED STATES PATENT OFFICE.

LEONARD T. JOHNSON, OF BOSTON, MASSACHUSETTS.

SCALE.

1,401,704.     Specification of Letters Patent.     Patented Dec. 27, 1921.

Application filed October 18, 1916. Serial No. 126,410.

*To all whom it may concern:*

Be it known that I, LEONARD T. JOHNSON, a citizen of the United States, and resident of Boston, in the county of Suffolk and State of Massachusetts, have invented an Improvement in Scales, of which the following description, in connection with the accompanying drawings, is a specification, like letters on the drawings representing like parts.

My present invention is an improved automatic weighing scale, having a novel arrangement and construction of thermostat and operating means therefor, and is a divisional so far as subject matter is common of my prior application, Serial No. 79,314, filed February 19, 1916, for scales, illustrating certain of the features of the present application.

In the class of automatic weighing scales, particularly computing and price indicating scales of the platform type, it is necessary to provide some device which will tend to correct temperature changes in the weighing mechanism. Heretofore it has been customary to interpose a thermostat device between the weighing springs and the platform receiving the goods to be weighed, which would act in some manner to tend to equalize the weighing action during extremes of heat and cold. My present invention of thermostat acts in a double capacity, and furthermore the thermostat is formed of a single substance, the lengthening and shortening of such single substance being capable of estimation to an exact degree, and automatically compensating for the temperature changes. Furthermore, I utilize novel forms of connection for the thermostat and the price computing chart, preferably interposing the thermostat and its connections with the chart mechanism only, instead of between the weighing springs and weight-receiving platform. This construction enables me to utilize a very light, sensitive, and yet strong construction, it being only necessary to vary the actuating devices of the price chart to compensate for temperature changes in the weighing spring and thereby eliminating the prior method of having heavy, strong thermostatic devices capable of withstanding the strain imposed between the weighing springs and the load.

A still further feature of my present invention consists in the novel connections between the thermostat and the price chart consisting in a leverage construction preferably of the bell-crank type, which will be automatically actuated by the thermostat to increase or decrease the length of the weighing lever or evening bar, simultaneously correcting the length of the connecting mechanism from the said lever to the price chart. I prefer to utilize a bell-crank lever and to have same operated by the thermostat, whereby said lever will control the length of the effective leverage from the evening bar to the price scale mechanism, swinging it inwardly and outwardly to compensate for capacity while simultaneously moving the price chart connections to keep the same at zero during temperature changes. In other words, one of the weighing levers which operates the price chart mechanism is lengthened or shortened to maintain the length of said lever adjusted to correct the weighing capacity of the scale during temperature changes and also the connections therefrom to the price chart, are automatically compensated to maintain the price chart at zero during all temperature changes. I therefore am enabled to automatically correct the weighing and price indicating mechanism by a simultaneous adjustment of two bars or connections and preferably by application of these compensating devices to the price chart mechanism only without disturbing the strong and heavy links or other connections between the weighing devices and the load being weighed.

While the thermostat features of my invention may be applied to any type of price computing or platform scale, I prefer to utilize the same in the novel form of scale shown in my said prior application wherein a counterpoise is eliminated, and an evener bar, in combination with a main lever, and both operating on the No. 1 principle, together with a free or "floating" fulcrum for the evener bar, are made use of.

Other details of the invention, advantageous features and modifications will be hereinafter more fully pointed out and claimed.

Referring to the drawings illustrating a preferred embodiment of the invention,

Figure 1:
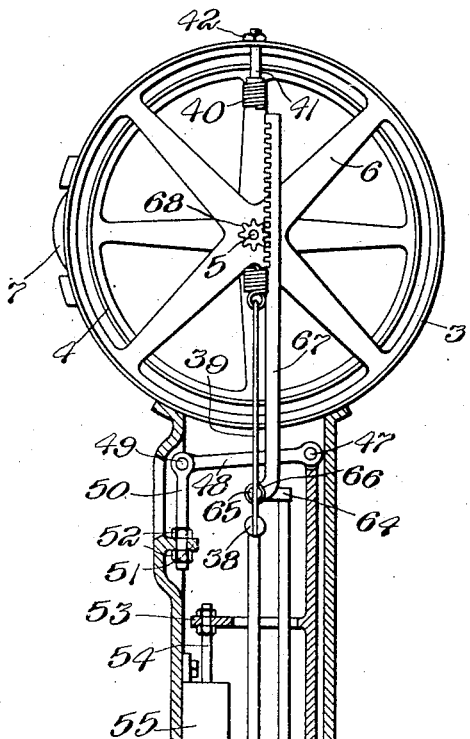
Figure 1 is a side view, partly in cross section, of my improved type of platform scale embodying a preferred form of the thermostat and connections.

As the present application is a divisional of the said prior application, reference thereto is made for details of the scale construction, the drawings attached hereto illustrating fully the novel thermostat and connections which I have elected to claim in this application.

Referring to the drawings, a base 1 carries a vertical support or standard 2, having a cylinder 3 supported at its upper portion, and carrying a drum 4 on which the price chart appears, said drum being supported on axles held in suitable bearings at the ends of the cylinder, the end of an axle 5 being shown extending through an arbor 6 which also supports said axles and is supported by the cylinder 3. A sight opening 7 is provided in the cylinder to permit view of the figures contained upon the price chart or drum 4. Rotation of the drum 4 actuated in connection with the weighing of a load, will indicate the price automatically and in a well-known manner.

The weighing platform 8 which is preferably of glass held within a flanged rim 9 on the supporting frame 10, rests upon bosses 11, 11, 11 carried on the supporting frame 10, said frame having two central depending lugs or side portions 12, constituting bearings resting upon bearing pins 13, carried in opposite forks of the main lever 14. This main lever is supported upon pedestals 15 secured to the base 1, bearing pins 17 extending from the main lever 14 and resting in the bearings at the top of the pedestals. I prefer to arrange the fulcrum for the main lever 14 forwardly of the platform bearings 13, and arrange my second lever, or evening bar 20, in a plane parallel with that of the main lever 14 and connected therewith at the outer end by a link 21, fitting over the upper bearing pin 22 held in a projecting lug 23 on the main lever 14 and the lower bearing pin 24 carried in a similarly projecting lug 25 on the evening bar 20. The pivotal bearings for the main lever 14 are preferably on a line equidistant between the platform bearings 12, 13, and the bearing of the link 21. The evening bar 20 is connected to the weighing springs of the scale at the opposite end to that of the link connection and has an intermediate flexible or floating fulcrum, consisting in a portion carrying bearing pins 26 bearing upwardly against a pair of stirrup blocks 28 at each side, each of said blocks being pivotally connected to the platform 1, preferably through staples 29. The forward end of the evening bar 20 is forked, having arms 30 on which bearing pins 32 are carried. These pins rest upon coöperating bearing blocks 34 held in a fork 36 connected to the rod 37 extending vertically through the hollow standard 2, and with its upper end flexibly connected onto the crossbar 38, said crossbar in turn having its ends pivotally united to links 39 attached to the weighing springs 40, supported at each end of the cylinder 3 and from its top by bolts 41 and nuts 42. I prefer to make the connections at opposite ends of the rod 37 as right and left-handed screws, so that rotating the rod 37 will secure an initial adjustment of the springs on the lever 20. Further adjustment can be obtained by tightening or loosening the nuts 42 on the bolts 41 of the weighing springs. By the construction thus described, it will be appreciated that the depression of the weighing platform 8 acting through the main lever 14 on the link 21 and the second or evening bar 20, will rock the latter on its fulcrum, depressing the forked arms 30 and pulling downwardly upon the rod 37, bar 38, links 39, and springs 40 until equilibrium is reached through the tension of the springs 40. The levers 14 and 20 are preferably in substantial parallelism, and it will be appreciated that by having the second lever 20 so arranged as to rock in parallelism with the main lever 14, and on the floating fulcrum at 26, that it is, in effect, the combination of two direct weighing levers on the simplest leverage principle, the second lever 20 acting as an evening bar in automatically compensating for the rocking of the first lever, transmitting such rocking movement directly to the weighing springs. The advantages of this construction and the elimination of a counterpoise, are fully explained in my said prior application. In the particular form of two-point support for the platform 8, illustrated in the drawings, it is necessary to have a device to hold the platform horizontal during the working of the scale. To this end I extend rearwardly from the frame 10 a portion 43 into the rear of the standard 2, passing through a slot 44 formed in said standard to permit entrance therein of the evening bar 20. Said extending portion 43 also being slotted at 45 to permit the weighing rod 37 to pass therethrough, and with an upwardly extending part 46. To the upper end of 46 is pivoted at 47 one end of a link 48, said link having its other end pivoted at 49 to an eye bolt 50 passing through a socket in a boss 51 formed at the front of the standard 2. This bolt 50 is adjustable vertically, having threaded thereon, above and below the bracket nuts 52 and 52'. The link 48, between its pivot points 47 and 49, is approximately equal to the distance on the main lever 14 between its central fulcrum and the platform support, and the bolt 50 is adjusted until the bar 48 is substantially parallel with said lever 14. This construction permits the platform 8 to be held horizontally during the vertical movement imparted thereto in the operation of the scale, the entire platform and portions 43 and 46 moving vertically in unison, the lengthening and shortening of the bar 48 being identical with the same movement of the lever 14 during such vertical reciprocation. I may apply a dashpot, if deemed desirable, conveniently attaching same by a bracket 53 extending from 46 and being connected with the piston rod 54 attached to a piston (not shown) within the dashpot 55.

To take care, automatically, of temperature changes in the weighing mechanism, I provide a novel form of thermostat and preferably connect said thermostat only with the chart actuating devices, as illustrated, although it is equally feasible to utilize a connection with the thermostat to both the spring and chart mechanism, if desired, and in any similar type of scale, either with or without a counterpoise. As the action of the evening bar 20 with the main lever 14 automatically takes care of a counterbalancing and weighing movement imparted to said lever I prefer to apply my thermostat directly to the evening bar. To this end the evening bar 20 is formed with depending lugs 56 and 57. The lug 56 at its forward end is threaded to receive the correspondingly threaded end of the thermostat 58, and the lug 57 is bored to permit the thermostat 58 to extend freely therethrough. I prefer to make said thermostat of a single metallic substance, such, for example, as brass, zinc, or ebenoid, to which temperature changes will impart a different movement, than that given to the bar 20, which is, for example, of iron. In cold weather the springs, being of steel, tend to shorten and stiffen, and therefore not only raise the scale bars out of adjustment, but also cause the scale to weigh incorrectly, and in warm weather the tendency is to lengthen and loosen correspondingly. The thermostat 58 is arranged to offset this effect of hot and cold temperature by the different lengthening and shortening of the thermostat bar 58 and its connections. At the forked end of the evening bar 20 is mounted on a pivot 59 a short lever 60, having its lower end pivoted at 61 to the free end of the thermostatic rod 58, so that variations in the temperature effects on the evening bar 20 and rod 58 will tend to rock the lever 60 on its pivot, the forward end of the rod 58 being rigidly united with the forward end of the bar 20 at 56. I prefer to form the lever 60 as a bell crank with its upper end pivoted at 62 to the rod 63 extending vertically within the standard 2, and having its upper end threaded into a block 64, said block being bored to receive the horizontal bar 65. This bar has, on each end, a sliding block 66, and in each block the end of a rack bar 67 is secured, which rack bars extend upwardly and mesh with pinions 68 on the outer ends of the axle 5, supporting the price chart and drum 4. Oscillation of the lever 60 and vertical movement of the rod 63 therefore produce changed actuation of the price chart relatively with the weighing mechanism, such change being dependent upon the variations of the bar 20 and the thermostat 58 with the temperature and the movement of the bell crank 60. The various threaded adjustments, both of the thermostat in the lugs 57 and the rod 63 in the block 64, permit of quick and ready assembling to secure appropriate working of the thermostat mechanism.

Figure 2:
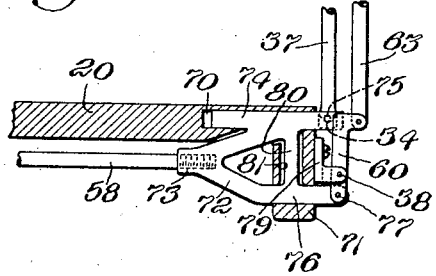
Fig. 2 is a detail view of a modified form of the thermostat and its connections.

In Fig. 2 I have illustrated a modification of the connection from the thermostat 58 to the rod 63 and also a construction uniting the rod 37 to the weighing springs and the evening bar 20 controlled by the thermostat to increase or decrease the effective leverage of the bar 20 and compensate for temperature changes. This construction is of advantage in certain types of scales. The forward end of the evening bar 20 is recessed at 70 and at 71 and a yoke 72 having one end 73 threaded onto the end of the thermostat 58 is provided with an upper portion 74 adapted to slide within the recess 70 and project out from the evening bar carrying a bearing point 75 on which the block 34 carried by the rod 37 contacts. This enables the action of the thermostat to control the leverage between the evening bar 20 and the weighing springs, the recess 70 being of sufficient length to permit the desired sliding movement. The lower part 76 of the yoke 72 projects through the recess 71 and is pivotally connected at 77 to the bellcrank 60 which operates the price chart actuating rod 63, as has been described, said lever being pivoted at 78 on a bracket 79 secured to the front of the evening bar. It may be desired to brace the yoke 72 by a cross piece 80, for which a correspondingly enlarged recess 81 will be formed to permit the relative movement of the yoke and the evening bar 20. In this construction both the weighing mechanism and the price chart mechanism are corrected by the thermostat for maintaining the weighing mechanism in proper condition for uniformity of weighing capacity, while the bellcrank lever acts to move the price chart lever 63 downwardly and upwardly to hold the drum and chart scale at zero.

Figure 3:
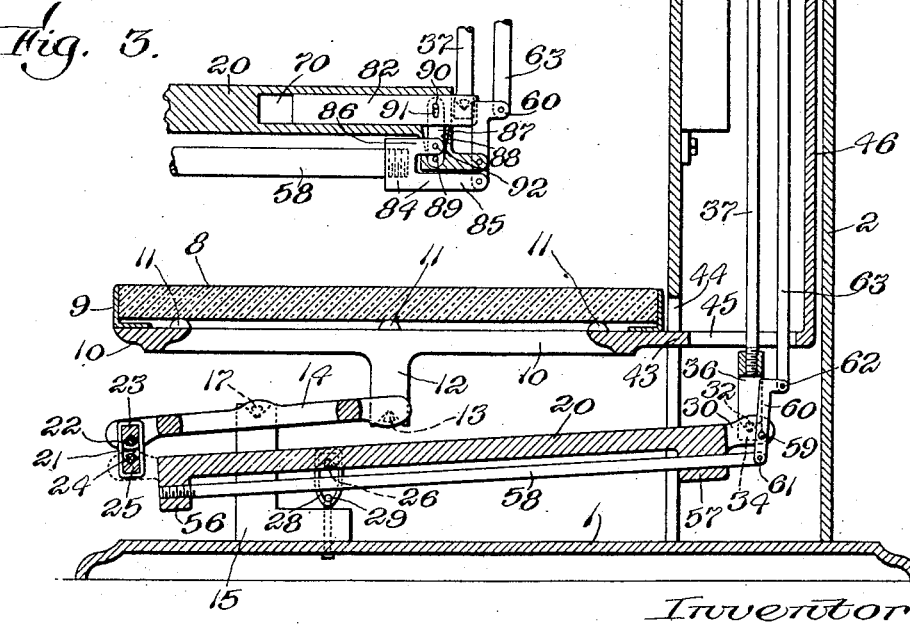
Fig. 3 is a still further modified form, shown partly in cross section.

In Fig. 3 I have illustrated a still further modification showing a construction whereby the connection between the evening bar 20 and rod 37 is controlled by the thermostat 58 and proportioned to the action of the thermostat on the bellcrank 60 and price chart actuating rod 63. In this construction the recess 70 receives a slide 82 having a bearing 83 to connect it with the rod 37.

The thermostat 58 carries a yoke 84 having one arm 85 pivoted to the bellcrank 60 and a short arm 86 pivoted to a lever 87, said lever being arranged in a recess 88 in the evening bar 20. This lever is pinned to the bar 20 at 89 and has a slot 90 in its upper portion engaging a pin 91 on the slide 92. Relative movement between the thermostat 58 and evening bar 20 will act to throw the slide 82 and a greater distance than the said relative movement, which distance may be proportioned in any desired degree. The weighing correction afforded by this construction is capable of a considerable range of adjustment, depending upon the location of the pin 91 and the pivot 92 connecting the arm 86 with the lever 87, as will be readily appreciated. The construction also affords great strength between the weighing springs and the load to be weighed, while permitting a simple and light thermostat 58 to be employed.

The operation will be readily understood from the foregoing description and the accuracy and efficiency of the thermostat corrections will be appreciated by those skilled in this art. I believe that the provision of a thermostat acting upon either the price chart mechanism or the weighing mechanism to effect correction, or temperature changes, is novel, and also that the provision of a thermostat controlling the length of one lever to hold the weighing mechanism at appropriate capacity while controlling the length of another lever or rod to hold the price chart at zero, is distinctly novel, and I wish to claim the same broadly. I am not herein claiming the novel arrangement of my main lever and evening bar swinging on a floating or flexible fulcrum and the various other novel features of my improved scale, as I have elected to claim these features in my said prior application.

My invention is further described and defined in the form of claims as follows:

1. In a scale of the kind described, the combination of a price chart, a weighing lever, means to control the movement of said lever with an evening bar movable with said lever parallel therewith and interposed between said lever and said means, a thermostat parallel with said lever and evening bar, and connections from said thermostat to the price chart to compensate for temperature changes.

2. In a scale of the kind described, the combination of counterbalancing weighing mechanism, a weighing lever and means to control the movement of said lever with an evening bar interposed between said lever and said means, and a thermostat carried by said evening bar and operable to automatically compensate for temperature changes in the scale mechanism.

3. A scale of the class described, having weighing mechanism including a main weighing lever and an evening bar parallel therewith and connected thereto, a price chart, a thermostat having one end affixed to said evening bar, and means carried by the evening bar arranged to be actuated by the free end of said thermostat connected to the price chart to compensate automatically for temperature changes in the weighing mechanism.

4. A platform scale of the class described, having a vertically reciprocating platform, means to hold said platform in a horizontal plane during its movements, a price chart, weighing mechanism for said platform, including a main lever pivoted forwardly of the platform support thereon, a second lever parallel therewith, connected to said main lever, and a thermostat movable with the second lever and connected to said price chart to actuate the price chart through the differences imparted to the second lever and said thermostat by temperature changes, to compensate in the indications of the price chart only for temperature changes in the weighing mechanism.

5. In a scale of the class described, a horizontal weighing lever carrying a thermostat, a bellcrank pivoted to said lever and connected with the thermostat and having its other end connected with the price indicating mechanism, whereby the thermostat will control the horizontal length of the lever to compensate for temperature changes in the capacity of the weighing mechanism and will control the vertical length of said price computing mechanism to maintain the indicator at zero.

In testimony whereof I have signed my name to this specification in the presence of two subscribing witnesses.

LEONARD T. JOHNSON.

Witnesses:
JAMES R. HODDER,
HAROLD J. CLARK.